US011146606B2

(12) United States Patent
Li

(10) Patent No.: US 11,146,606 B2
(45) Date of Patent: Oct. 12, 2021

(54) DATA BUFFERING METHOD, NETWORK DEVICE, AND STORAGE MEDIUM

(71) Applicant: Tencent Technology (Shenzhen) Company Limited, Shenzhen (CN)

(72) Inventor: Zhicheng Li, Shenzhen (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 202 days.

(21) Appl. No.: 16/391,395

(22) Filed: Apr. 23, 2019

(65) Prior Publication Data

US 2019/0253470 A1 Aug. 15, 2019

Related U.S. Application Data

(63) Continuation of application No. PCT/CN2018/085383, filed on May 2, 2018.

(30) Foreign Application Priority Data

May 16, 2017 (CN) .......................... 201710345070.4

(51) Int. Cl.
*H04L 29/06* (2006.01)
*H04N 21/647* (2011.01)
(Continued)

(52) U.S. Cl.
CPC ........ *H04L 65/601* (2013.01); *H04L 65/4069* (2013.01); *H04L 65/80* (2013.01);
(Continued)

(58) Field of Classification Search
CPC ......... H04N 21/2187; H04N 21/23406; H04N 21/2343; H04N 21/234336; H04N 21/262;
(Continued)

(56) References Cited

U.S. PATENT DOCUMENTS

2001/0047517 A1* 11/2001 Christopoulos ........ H04N 19/40
725/87
2002/0174434 A1 11/2002 Lee et al.
(Continued)

FOREIGN PATENT DOCUMENTS

CN 1996942 A 7/2007
CN 101378361 A 3/2009
(Continued)

OTHER PUBLICATIONS

International Search Report for corresponding PCT/CN2018/085383, dated Jul. 24, 2018.
(Continued)

*Primary Examiner* — James R Sheleheda
(74) *Attorney, Agent, or Firm* — Oblon, McClelland, Maier & Neustadt, L.L.P.

(57) ABSTRACT

Embodiments of the present disclosure provide a data buffering method. In the method, a network device obtains multimedia data and network characteristic information of a communications network. The communications network includes a first communications network or a second communications network, the first communications network is configured to transmit the multimedia data to the network device, and the second communications network is configured to transmit the multimedia data to a terminal device. A target data volume corresponding to the terminal device is determined at least based on the network characteristic information of the first communications network and/or the second communications network. First buffered data representing the multimedia data is determined based on the obtained multimedia data and has the target data volume. The first buffered data is sent to the terminal device by using the second communications network. A data volume of the
(Continued)

first buffered data matches the network characteristic information.

20 Claims, 7 Drawing Sheets

(51) Int. Cl.
 H04N 21/234 (2011.01)
 H04N 21/2343 (2011.01)
 H04N 21/2187 (2011.01)
 H04N 21/643 (2011.01)
 H04N 21/845 (2011.01)
 H04N 21/262 (2011.01)

(52) U.S. Cl.
 CPC ..... H04N 21/2187 (2013.01); H04N 21/2343 (2013.01); H04N 21/23406 (2013.01); H04N 21/234336 (2013.01); H04N 21/262 (2013.01); H04N 21/643 (2013.01); H04N 21/647 (2013.01); H04N 21/64738 (2013.01); H04N 21/64792 (2013.01); H04N 21/845 (2013.01)

(58) Field of Classification Search
 CPC ............... H04N 21/643; H04N 21/647; H04N 21/64738; H04N 21/64792; H04N 21/845; H04L 65/601; H04L 65/4069; H04L 65/80
 See application file for complete search history.

(56) References Cited

U.S. PATENT DOCUMENTS

| 2006/0109856 | A1 | 5/2006 | Deshpande |
| 2009/0083432 | A1 | 3/2009 | Saito et al. |
| 2009/0307367 | A1 | 12/2009 | Gigliotti |
| 2012/0013748 | A1* | 1/2012 | Stanwood ............... H04L 47/32 348/192 |
| 2017/0318602 | A1* | 11/2017 | Wang ............... H04N 21/64792 |

FOREIGN PATENT DOCUMENTS

| CN | 103023688 A | 4/2013 |
| CN | 104394440 A | 3/2015 |
| CN | 105430475 A | 3/2016 |
| CN | 105847944 A | 8/2016 |
| CN | 105848011 A | 8/2016 |
| CN | 105992023 A | 10/2016 |
| CN | 106256132 A | 12/2016 |
| CN | 106537856 A | 3/2017 |
| CN | 106612456 A | 5/2017 |
| EP | 2 574 010 A2 | 3/2013 |
| JP | 2002-319971 A | 10/2002 |
| JP | 2005-244315 A | 9/2005 |
| WO | 2010/041469 A1 | 4/2010 |
| WO | 2015/014403 A1 | 2/2015 |
| WO | 2016/064308 A1 | 4/2016 |

OTHER PUBLICATIONS

Written Opinion for corresponding PCT/CN2018/085383, dated Jul. 24, 2018.
Office Action dated Aug. 19, 2020 in corresponding Korean Patent Application No. 10-2019-7025444, along with a partial English translation.
Extended European Search Report dated Feb. 20, 2020 in corresponding European Application No. 18801525.9.
Supplemental European Search Report dated Mar. 10, 2020 in corresponding European Application No. 18801525.9.
Office Action dated Sep. 1, 2020 in Japanese Application No. 2019-534822.
Office Action dated Feb. 10, 2021 in Chinese Application No. 201710345070.4, along with a partial English translation.

* cited by examiner

DATA BUFFERING METHOD, NETWORK DEVICE, AND STORAGE MEDIUM

RELATED APPLICATION

This application is a continuation of International Application No. PCT/CN2018/085383, filed on May 2, 2018, which claims priority to Chinese Patent Application No. 201710345070.4 entitled "DATA BUFFERING METHOD, NETWORK DEVICE, AND STORAGE MEDIUM" filed on May 16, 2017. The entire disclosures of the prior applications are hereby incorporated by reference in their entirety.

FIELD OF THE TECHNOLOGY

The present disclosure relates to a data buffering method, a network device, and a storage medium.

BACKGROUND OF THE DISCLOSURE

In a related live streaming process, a content delivery network (CDN, Content Delivery Network) node configures a buffering area for a user based on a user requirement (such as a delay requirement), to store audio/video data of an anchor/streamer (referred to as buffered data), so that when the user accesses the CDN node, the CDN node sends the audio/video data of the streamer and buffered in the configured buffering area to the user at one time. In a process of watching the live streaming, the user can receive the audio/video data of the streamer and delivered by the CDN node in real time. In this case, because when the user accesses the CDN node, the CDN node sends all the audio/video data of the streamer and buffered in the buffering area to the user at one time, frame freezing may occur when the user plays the audio/video.

SUMMARY

Embodiments of the present disclosure provide a data buffering method and a network device, to fluently play data during live streaming.

The technical solutions of the embodiments of the present disclosure are implemented in the following methods.

According to an embodiment of the present disclosure, a data buffering method is provided. In the method, a network device obtains multimedia data and network characteristic information of a communications network. The communications network includes a first communications network or a second communications network. The first communications network is configured to transmit the multimedia data from a host device or a source site to the network device, and the second communications network is configured to transmit the multimedia data from the network device to a terminal device. Furthermore, a target data volume corresponding to the terminal device is determined at least based on the network characteristic information of the first communications network and/or the second communications network. First buffered data representing the multimedia data is determined based on the obtained multimedia data and has the target data volume. The first buffered data is sent to the terminal device by using the second communications network. A data volume of the first buffered data matches the network characteristic information. According to an embodiment of the present disclosure, a network device is provided. The network device includes circuitry. The circuitry is configured to obtain multimedia data and network characteristic information of a communications network. The communications network includes a first communications network or a second communications network. The first communications network is configured to transmit the multimedia data from a host device or a source site to the network device, and the second communications network is configured to transmit the multimedia data from the network device to a terminal device. The circuitry is further configured to determine, at least based on the network characteristic information of the communications network, a target data volume corresponding to the terminal device. The circuitry is further configured to determine, based on the transmitted multimedia data, first buffered data representing the multimedia data. The first buffered data has the target data volume. The circuitry is further configured to send the first buffered data to the terminal device by using the second communications network. A data volume of the first buffered data matches the network characteristic information.

According to an embodiment of the present disclosure. A data buffering method is provided. The method is performed by a network device. The network device includes one or more processors, a memory, and one or more programs. The one or more programs are stored in the memory, and the one or more programs include one or more units. Each of the one or more units corresponds to a set of instructions, and the one or more processors are configured to execute the instructions. In the method, the network device obtains multimedia data and network characteristic information of a communications network. The communications network includes a first communications network or a second communications network. The first communications network is configured to transmit the multimedia data from a host device or a source site to the network device, and the second communications network is configured to transmit the multimedia data from the network device to a terminal device. Furthermore, a target data volume corresponding to the terminal device is determined at least based on the network characteristic information of the first communications network and/or the second communications network. First buffered data representing the multimedia data is determined based on the obtained multimedia data and has the target data volume. The first buffered data is sent to the terminal device by using the second communications network. A data volume of the first buffered data matches the network characteristic information.

According to an embodiment of the present disclosure, a network device is provided. The network device includes a processor and a memory configured to store a computer program running on the. The processor is configured to perform the foregoing data buffering method.

According to an embodiment of the present disclosure, a computer-readable storage medium storing a computer executable instruction is provided. The computer executable instruction is used to perform a data buffering method. In the method, multimedia data and network characteristic information of a communications network are obtained. The communications network includes a first communications network or a second communications network. The first communications network is configured to transmit the multimedia data from a host device or a source site to a network device, and the second communications network is configured to transmit the multimedia data from the network device to a terminal device. Furthermore, a target data volume corresponding to the terminal device is determined at least based on the network characteristic information of the first communications network and/or the second communications network. First buffered data representing the multimedia data is determined based on the obtained multimedia data and has the target data volume. The first buffered data is sent to the terminal device by using the second communications network. A data volume of the first buffered data matches the network characteristic information.

Application of the data buffering method, the network device, and the storage medium according to the embodiments of the present disclosure at least have the following technical advantages:

The target data volume corresponding to the terminal device is determined by the network device based on an actual network status, and therefore the first buffered data having the target data volume and determined by the network device can match the actual network status. Therefore, frame freezing caused by a fixed volume of buffered data can be reduced and broadcast fluency can be improved.

DESCRIPTION OF EMBODIMENTS

The following further describes the present disclosure in detail with reference to the accompanying drawings and the embodiments. The specific embodiments described herein are merely used to explain the present disclosure but are not intended to limit the present disclosure.

In an actual application of CDN, in the related technology, because all audio/video data of an anchor/streamer buffered in a buffering area is sent by a CDN node to a user at one time, the following problems exist.

First: When a network is congested, because there is a relatively large volume of audio/video data in live broadcast/ streaming, and uplink transmission of some high-bit-rate audio/video data requires a bandwidth of 2 megabyte per second (Mbps, Megabytes Per Second), if a buffering period of 5 seconds is configured for a user, a corresponding data volume is 10 M, and thus, there is 10 M data to be delivered once the user accesses the CDN node. For a user that has an unstable network environment, such as uplink/downlink speed jitter and frequent offline issues caused by a bad network access condition, the user is very likely to experience network congestion and transmission control protocol (TCP, Transmission Control Protocol) Zero Window.

Second: In a scenario of high-bit-rate live streaming, if a buffering volume is fixed, for a user whose terminal configuration is bad, and if buffered data that is of a fixed size and that is delivered after the user accesses the CDN node is greater than a buffering capacity of the terminal configuration, it may cause black screen/splash screen due to frame skipping.

Third: Because the buffering volume is fixed, in a process of watching the live streaming, if frame freezing occurs and the streamer re-accesses the network, an anti-frame-freezing capability is reduced. In this case, a maximum anti-frame-freezing capability of the terminal is the buffering period of the terminal configuration.

Therefore, to resolve the foregoing problems, the embodiments of the present disclosure provide a data buffering method and a network device, so that buffered audio/video data of the CDN node can be dynamically adjusted based on the user network environment and terminal configuration to lay a foundation for reducing a quantity of times of frame freezing, and simultaneously lay a foundation for improving watching experience of live streaming.

Figure 1:
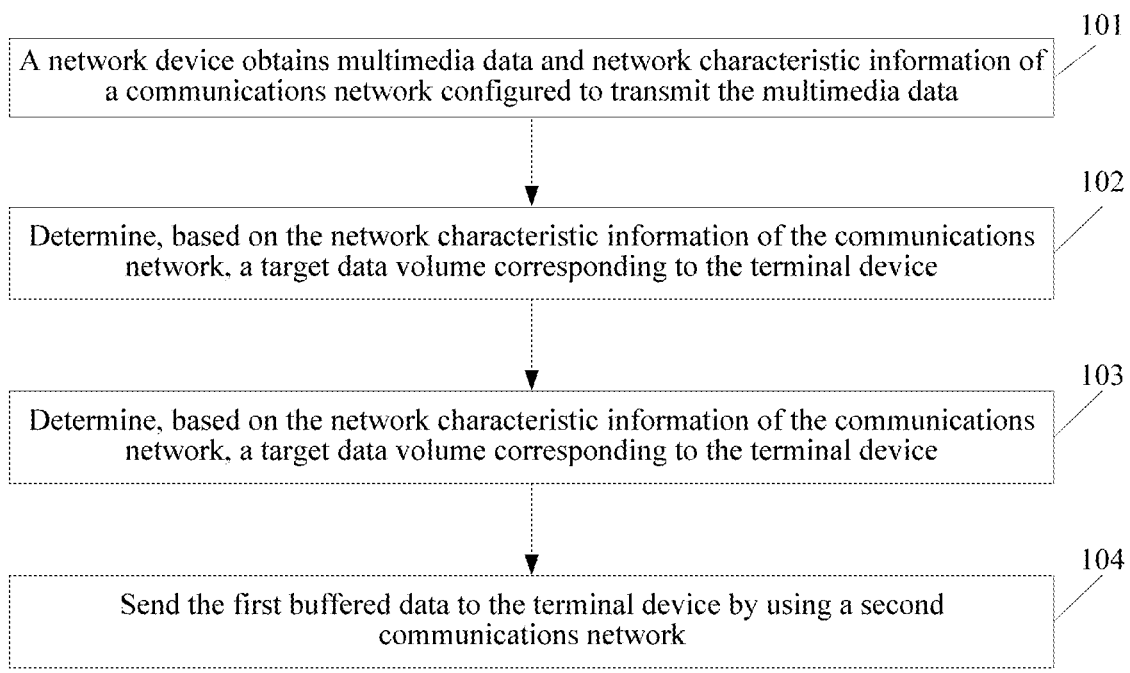
FIG. 1 is a schematic flowchart of implementing a data buffering method according to an embodiment of the present disclosure.

FIG. 1 is a schematic flowchart of implementing a data buffering method according to an embodiment of the present disclosure. The method may be applied to a network device, for example, a CDN node. As shown in FIG. 1, the data buffering method according to this embodiment of the present disclosure includes the following steps:

In Step 101, a network device obtains multimedia data and network characteristic information of a communications network configured to transmit the multimedia data.

The communications network includes a first communications network or a second communications network, the first communications network is configured to transmit the multimedia data to the network device, and the second communications network is configured to transmit the multimedia data to a terminal device.

In an embodiment, the multimedia data may be audio data and/or video data.

The first communications network may be a communications network between a transmit end and a network device. For example, in a live streaming scenario, the first communications network may be a communications network between a streamer's device and a CDN node, or the first communications network may be a communications network between a network device (for example, the CDN node) and a source site. The source site may be a server that stores original audio/video data which is uploaded by a streamer of the live streaming.

In some embodiments of this method, the first communications network may be a communications network used when the network device obtains the multimedia data. The second communications network may be a communications network between the network device and a receiver terminal that receives the multimedia data in the live streaming, for example, the communications network between the CDN node and a user device watching the live streaming.

Figure 2:
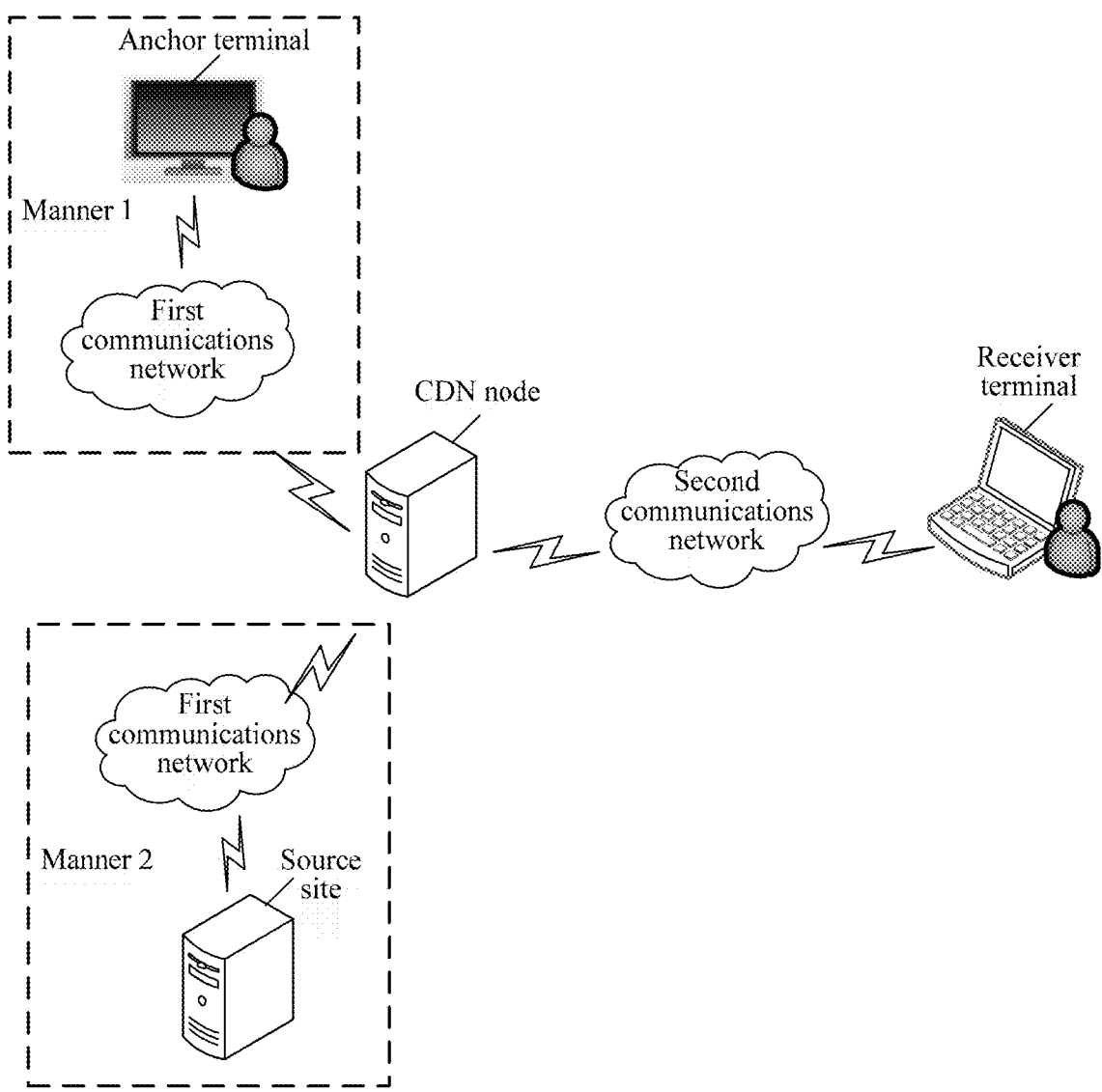
FIG. 2 is a schematic diagram of an application scenario of a data buffering method according to an embodiment of the present disclosure.

FIG. 2 is a schematic diagram of a network configuration that implements a data buffering method according to an embodiment of the present disclosure. As shown in FIG. 2, this embodiment may be applied to live streaming. In live streaming, a CDN node may obtain audio/video data of a streamer terminal in two manners, namely, manner 1 and manner 2.

For example, in manner 1, the CDN node may directly obtain, from the streamer terminal using the first communications network, audio/video data collected by the streamer terminal in real time (that is, live streaming data), to further transmit the obtained audio/video data to the receiver terminal by using the second communications network, to implement a live streaming viewing procedure.

In manner 2, the CDN node may obtain, from a source site by using the first communications network, audio/video data corresponding to the streamer terminal (namely, the live streaming data), to further transmit, by using the second communications network, the obtained audio/video data to the receiver terminal. Herein, before the CDN node obtains the audio/video data from the source site, the streamer terminal uploads the audio/video data that is collected in real time by the streamer terminal to the source site to store the audio/video data (a connection relationship between the live streaming terminal and the source site is not shown in FIG. 2). As a result, an embodiment of a live streaming viewing procedure is implemented. In some embodiments, an approach/route of obtaining the audio/video data by the CDN node may be determined based on an actual situation, for example, a network congestion status.

For example, the network characteristic information includes, but is not limited to, at least one of the following information: delay, bandwidth, delay change (namely, jitter), traffic, and the like. In this case, network performance can be evaluated based on the network characteristic information. For example, whether a network is congested can be determined by using the network characteristic information.

In Step 102, determine, based on the network characteristic information of the communications network, a target data volume/size corresponding to the terminal device.

In an embodiment, when determining the target data volume, the network device may further consider a buffering status of the terminal device, to further improve a matching degree between the determined the target data volume and the terminal device (e.g., an actual network environment corresponding to the terminal device, and an actual buffering capacity of the terminal device). In an embodiment, the network device obtains the buffering volume of the terminal device, to further determine, at least based on the buffering volume and the network characteristic information of the first communications network and/or the second communications network included in the communications network, where the target data volume corresponds to the terminal device. For example, a weight of the playing/broadcast parameter and a weight of the buffering volume of the terminal device can be configured, and then a weighting processing is performed on the broadcast parameter and the buffering volume. Subsequently, preset data volume matching the terminal device is determined based on the weighted broadcast parameter and the weighted buffering volume. The type of the buffering volume may include at least one of a buffering original capacity and a remaining capacity.

In an embodiment, the target data volume is represented by using a number of preset image units. For example, the target data volume is represented by using a number of groups of pictures (GOP, Group Of Pictures). In this case, the target data volume corresponding to the terminal device may be determined by the method described in Step 102. In Step 102, the network device determines a first number of preset image units that correspond to the terminal device and need to be buffered, and uses a total data volume of the preset image units of the first number as the target data volume of the terminal device.

The GOP may include a series of I frames, P frames, and B frames in a fixed mode. The I frame is an intra-frame representing a key frame, and contains a complete image. Further, the I frame may be decoded by using only data of the I frame itself. The P frame is a forward predictive frame representing a difference between the frame and a previous key frame or a previous P frame, and needs to use, during decoding, a previously-buffered image plus a difference defined by the frame, so as to generate a final image. The B frame is a bidirectional predicted interpolated frame representing a bidirectional difference frame. For example, the B frame records a difference between the frame and a previous and a following frame, and has a high compression rate. The P frame and the B frame consume more hardware resources such as a central processor (CPU) during decoding than the I frame.

In an embodiment, for a user device that can tolerate a video delay which is greater than a delay threshold (e.g., a delay time that can be apparently perceived, for example, 10 seconds) in terms of a real-time requirement, the target data volume may be set to at least one GOP buffer, and a number of GOPs may be dynamically adjusted in real time based on a user network status. The network device may not set a target data volume, namely, the network device does not perform buffering. For example, the following scenarios explain how a number of GOPs may be dynamically adjusted in real time based on a user network status:

Scenario 1: When a jitter of a video delay of a streamer terminal is less than a jitter threshold, that is, an uplink is stable, and a network environment of an audience is congested (that is, a receiver terminal), the target data volume is a data volume of a closest GOP. For example, the first buffered data is a closest GOP.

Scenario 2: When an uplink of a streamer terminal is stable, and a network environment of an audience is normal, the target data volume is zero, or is at most a data volume of a closest GOP. For example, the first buffered data does not store or at most store a closest GOP.

Scenario 3: When a jitter of a video delay of a streamer terminal is greater than a jitter threshold, that is, an uplink is unstable, and a network environment of an audience is congested, the target data volume is a data volume corresponding to the closest two or more GOPs. For example, the first buffered data is the two or more closest GOPs.

Scenario 4: When an uplink of a streamer terminal is unstable, and a network environment of an audience is normal, the target data volume is a data volume corresponding to closest three or more GOPs. For example, the first buffered data is three or more closest GOPs.

Herein, it is noted that, the foregoing listed scenarios are merely examples, and a number of GOPs may be adjusted based on other scenarios. For example, to avoid an excessively long latency (watching delay) of live streaming, there is a limit of the target data volume. In this regard, the limit may specify a maximum data volume of GOPs that does not exceed a preset number. Otherwise, the live streaming latency may be increased.

In Step 103, determine, based on the obtained multimedia data, first buffered data representing the multimedia data and having the target data volume.

In Step 104, send the first buffered data to the terminal device by using a second communications network.

The data volume of the first buffered data matches the network characteristic information.

Figure 3:
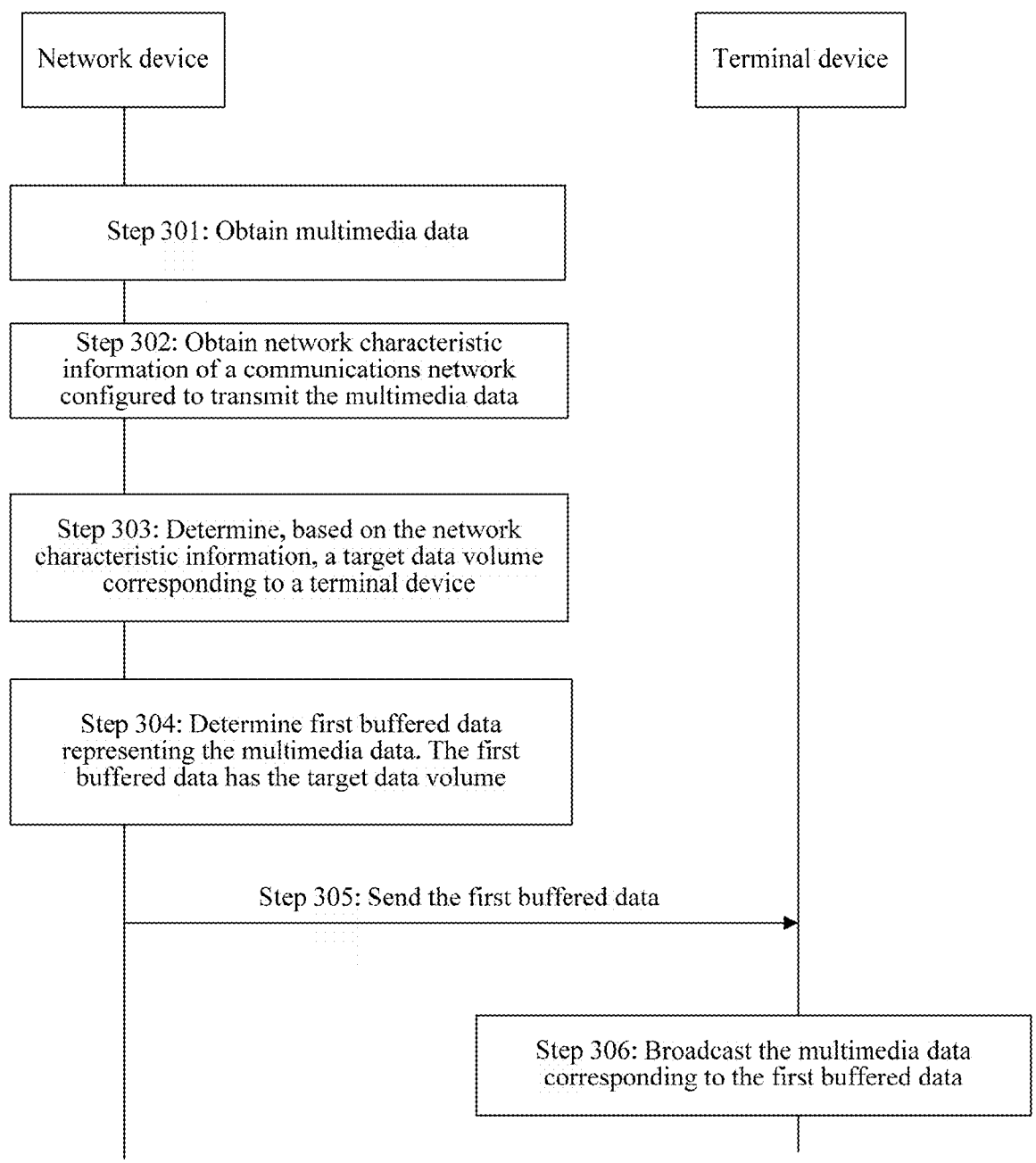
FIG. 3 is a schematic flowchart of a data buffering method according to an embodiment of the present disclosure.

For example, FIG. 3 is a schematic flowchart of a data buffering method according to an embodiment of the present disclosure. As shown in FIG. 3, the method includes the following steps.

In Step 301, a network device obtains multimedia data.

In Step 302, the network device obtains network characteristic information of a communications network configured to transmit the multimedia data.

In Step 303, the network device determines, based on the network characteristic information, a target data volume corresponding to the terminal device.

In Step 304, the network device determines first buffered data representing the multimedia data. The first buffered data has the target data volume.

In Step 305, the network device sends the first buffered data to the terminal device.

In Step 306, play/broadcast the multimedia data corresponding to the first buffered data.

After determining the target data volume and determining the first buffered data having the target data volume, the network device may send the first buffered data to the terminal device by using the second communications network, so that the terminal device plays multimedia data corresponding to the first buffered data. As a result, because the target data volume is determined based on the actual network status, the data volume of the first buffered data received by the terminal device can match the actual network status. Thus, the risks of frame freezing caused by a fixed volume of buffered data can be reduced and anti-frame-freezing capability can be significantly improved.

When the user network environment is congested, or when a network through which the CDN node accesses the source site is congested, buffered history data can be discarded based on a size of a buffered data volume (that is, the target data volume), and data of a closest GOP is buffered, to ensure fluency of live streaming. In an embodiment, the network device determines, based on the network characteristic information of the first communications network and/or the second communications network included in the communications network, whether it needs to perform frame loss processing on the first buffered data. If the frame loss processing needs to be performed on the first buffered data, the network device obtains an order of the priorities of frame types of an audio frame and/or a video frame when it is determined to perform the frame loss processing on the first buffered data. The network device then performs the frame loss processing on the audio frame and/or the video frame in the first buffered data based on the order of the priorities of the frame types, to reduce the data volume of the first buffered data. For example, the audio frame is discarded after the video frame is discarded. In this case, the B frames in the video frame may be discarded first. The B frames are a bidirectional predictive frame having a high compression rate, and encoding and decoding the B frames consume a large CPU delay. The P frames may be discarded next. Finally, the I frames are discarded.

In an embodiment, it is be noted that, the first buffered data having the target data volume and determined by using the method in this embodiment may be sent, to the terminal device by using the second communications network after the terminal device of the user accesses the network device, that is, after the network device establishes the second communications network with the terminal device. For example, in an embodiment, after determining the first buffered data corresponding to the terminal device and detecting network establishment success information of the second communications network, the network device sends the first buffered data to the terminal device to the second communications network. In this case, the target data volume may be determined with reference to a broadcast parameter that is used to play the multimedia data and that corresponds to the terminal device. The broadcast parameter is used to represent play performance of broadcasting the multimedia data by the terminal device, for example, a maximum delay of the terminal device or a frame freezing degree. Then, the target data volume is determined with reference to the maximum delay of the terminal device or the frame freezing degree. When the terminal device is connected to the network device, the network device may first send the first buffered data to the terminal device. Herein, because the first buffered data is generated based on terminal configuration, there is a specific quantity of buffers in a player of an audience by using the first buffered data. For example, when the terminal device is connected to the network device, the network device may deliver the configured first buffered data to the network device at one time. As a result, frame freezing during live streaming caused by network performance issues such as a network jitter, unstableness of uplink audio/video data of a streamer, and a problem of a retrieval network of the CDN node (e.g., a network between the CDN node and the source site) can be reduced in a watching process of an audience. For example, the target data volume is not necessarily large because an excessively large data volume increases live streaming latency.

Alternatively, the first buffered data having the target data volume may be sent, after the second communications network is established, to the terminal device by the network device by using the second communications network. For example, using live streaming as an example, the first buffered data may be sent by the network device to the terminal device once the terminal device of the user is accessed, or is sent by the network device to the terminal device in the live streaming process.

In an embodiment, because the data volume of the first buffered data is determined based on the actual network status, regardless of whether the first buffered data is sent to the terminal device at the beginning of the establishment of the live streaming or is sent to the terminal device in the live streaming process, the frame freezing issue caused by network congestion can be avoided. In addition, when the network is congested, first buffered data having a relatively small data volume can be determined by using the method in this embodiment. As a result, a larger network load can be avoided.

Therefore, by the method in this embodiment of the present disclosure, because the target data volume corresponding to the terminal device is determined by the network device based on the actual network status, the first buffered data determined by the network device and having the target data volume can match the actual network status regarding the first buffered data. Therefore, this embodiment of the present disclosure can reduce risks of frame freezing caused by a fixed volume of buffered data and improve anti-frame-freezing capability, to further lay a foundation of improving user experience.

Figure 4:
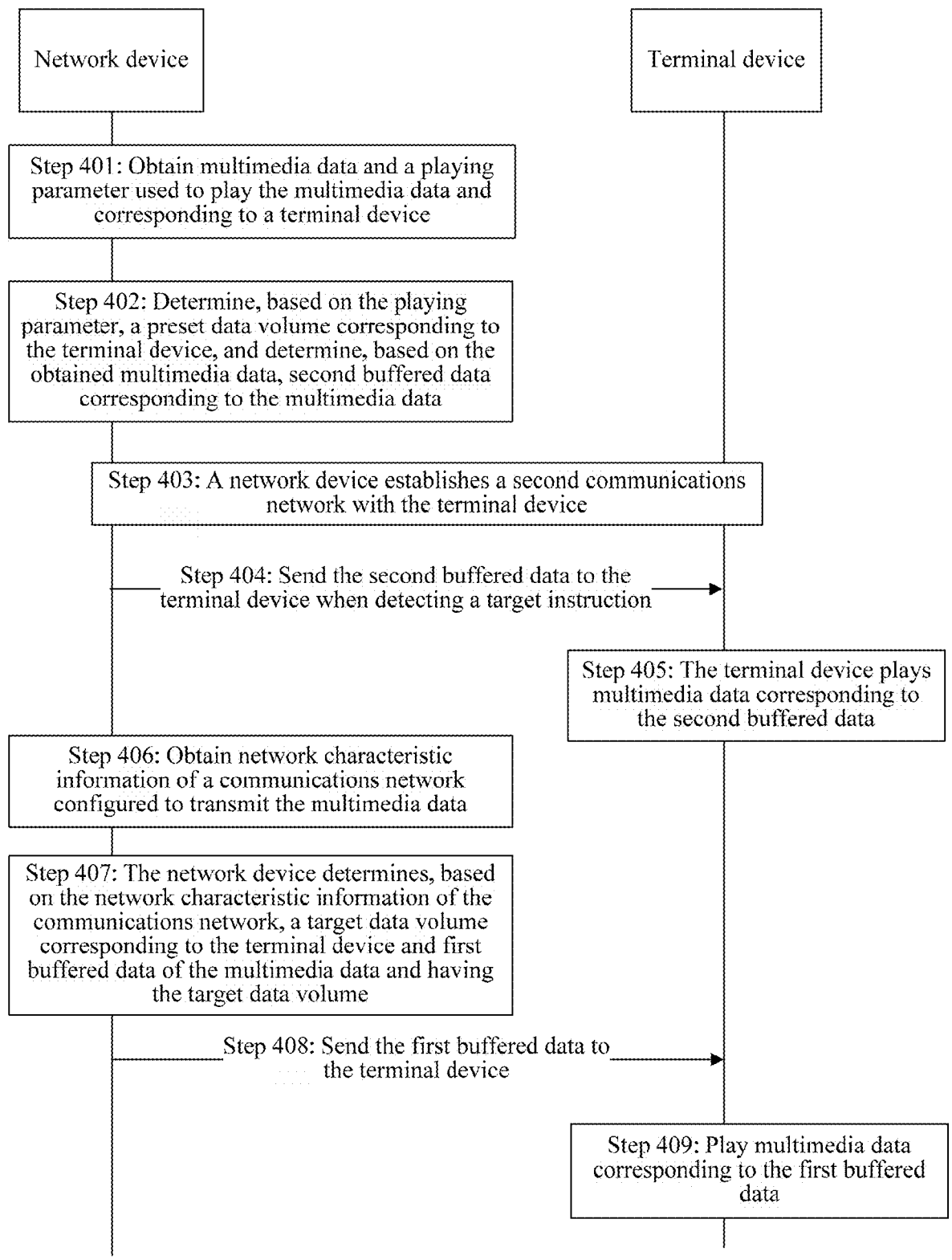
FIG. 4 is a schematic flowchart of implementing a data buffering method according to an embodiment of the present disclosure.

In an embodiment, a two-level buffering method can be used to resolve a problem of frame freezing caused by a fixed volume of buffered data. FIG. 4 is a schematic flowchart of implementing a data buffering method according to an embodiment of the present disclosure. As shown in FIG. 4, the method includes the following steps.

In Step 401, a network device obtains multimedia data and a playing/broadcast parameter used to play the multimedia data and corresponding to a terminal device.

In an embodiment, the broadcast parameter may be a maximum delay that may occur on the terminal device, or may be a frame freezing degree that may occur.

In Step 402, the network device determines, based on the broadcast parameter, a preset data volume corresponding to the terminal device, and determines, based on the obtained multimedia data, second buffered data corresponding to the multimedia data.

The second buffered data has the preset data volume.

In Step 403, the network device establishes a second communications network with the terminal device.

After the second communications network is successfully established, the terminal device generates a target instruction. The target instruction instructs the network device to send the second buffered data.

In Step 404, the network device sends the second buffered data to the terminal device when detecting the target instruction.

The data volume of the second buffered data obtained by the terminal device matches the broadcast parameter.

In Step 405, the terminal device plays multimedia data corresponding to the second buffered data.

In an embodiment of the present disclosure, the target instruction is generated at least based on the network establishment success information of the second communications network established by the terminal device with the network device. For example, the target instruction is generated by the terminal device at least based on access success information of accessing the network device by the terminal device. As a result, after the terminal device accesses the network device, the network device may first send first-level buffered data to the terminal device, namely, the second buffered data. Herein, because the second buffered data is generated based on terminal configuration, there is a specific quantity of buffers in the player of the audience by using the first-level buffered data. For example, when the terminal device accesses the network device, the network device may deliver the configured second buffered data to the network device at one time. Thus, frame freezing during live streaming caused by network performance issues such as a network jitter, unstableness of uplink audio/video data of a streamer, and a problem of a retrieval network of the CDN node (e.g., a network between the CDN node and the source site) can be reduced in a watching process of an audience. In this case, the preset data volume is not necessarily large, and an excessively large data volume may increase the live streaming latency.

In an embodiment, the preset data volume may be represented by using a number of preset image units. For example, the preset data volume may be represented by using a number of GOPs and may be set as at least one GOP. Further, the number of GOPs may be dynamically adjusted in real time based on a user network status.

In an embodiment, after sending the first-level buffered data to (that is, the second buffered data) the terminal device, the network device further sends second-level buffered data based on an actual network status.

In Step 406, the network device obtains network characteristic information of a communications network configured to transmit the multimedia data.

In Step 407, the network device determines, based on the network characteristic information of the communications network, a target data volume corresponding to the terminal device and the first buffered data of the multimedia data and having the target data volume.

In Step 408, the network device sends the first buffered data to the terminal device.

In Step 409, the terminal device plays multimedia data corresponding to the first buffered data.

Namely, the first buffered data is second-level buffered data. Herein, because second-level buffered data is determined based on an actual network status in the live streaming process, this embodiment can reduce as much as possible risks of frame freezing during live streaming in the manner of two-levels of buffering.

Herein, for a process of determining the target data volume and the first buffered data, refer to the manner in the foregoing embodiment.

When determining the first-level buffered data, the network device may refer to the buffering volume of the terminal device. In an embodiment, the terminal device obtains the buffering volume of the terminal device, to determine, based on the broadcast parameter and the buffering volume, the preset data volume matching the terminal device. Therefore, it helps reduce black screen/splash screen caused by bad terminal configuration and excessive amount of buffered data, and further lays a foundation for improving live streaming watching experience of the user.

The preset data volume may further be determined based on the network characteristic information of the first communications network and/or the second communications network that is included in the communications network. A determining process refers to the foregoing process of determining the target data volume.

Figure 5:
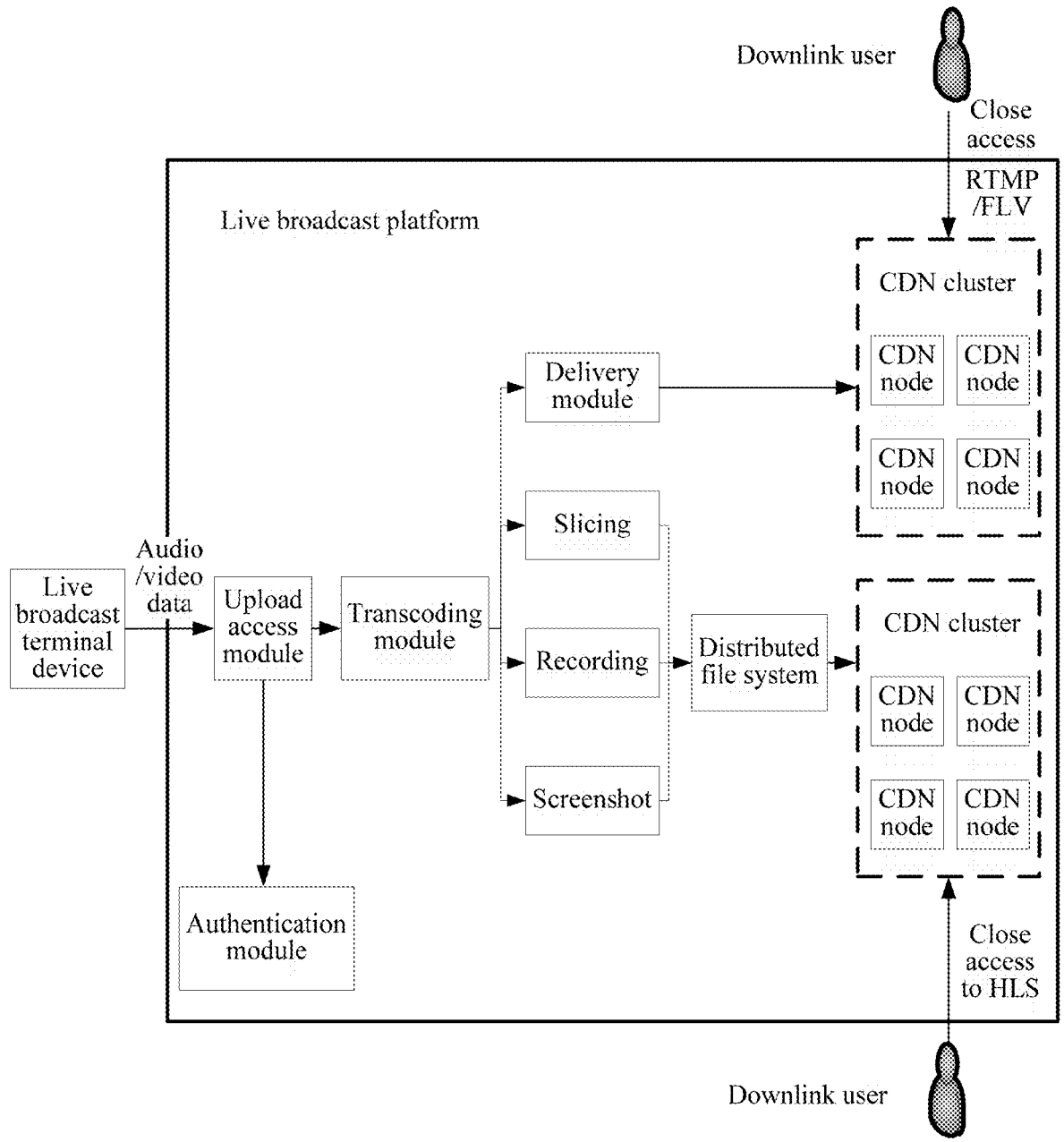
FIG. 5 is a schematic diagram of a framework of a data buffering method during application according to an embodiment of the present disclosure.

The following describes in detail the embodiments of the present disclosure with reference to the following application scenario. As shown in FIG. 5, a terminal device of live streaming (e.g., a terminal having a camera, such as a desktop and a smartphone) collects, quantizes, and encodes audio/video data, and encapsulates the audio/video data and uploads the encapsulated audio/video data to an upload (upload) access module in the live streaming platform by using a real time messaging protocol (Real Time Messaging Protocol, RTMP). The upload access module authenticates, in an authentication center based on a carried authentication information parameter uploaded by the user, whether the terminal device of the live streaming has a live streaming permission. If the terminal device of the live streaming has a live streaming permission, the upload access module transmits the audio/video data corresponds to the terminal device of the live streaming to a transcoding module. The transcoding module then performs transcoding based on a format of an audio/video watched by a downlink user (for example, a receiver terminal) and delivers the transcoded audio/video data to each CDN cluster.

The CDN cluster includes at least two CDN nodes. Herein, when an audio/video format supported by the downlink user is RTMP/FLV (Flash Video), the transcoding module directly sends the audio/video data to CDN cluster by using a delivery module, and delivers the audio/video data to the downlink user by using a specific CDN node in the CDN cluster (for example, a CDN node closest to the downlink user). When the audio/video format supported by the downlink user is HyperText Transfer Protocol Live Streaming (HLS), transcoding module sends the audio/video data to a distributed file system by performing recording, screenshot, and slicing, and sends the audio/video data to the CDN cluster by using the distributed file system, to further delivers the audio/video data to the downlink user by using a specific CDN node in the CDN cluster (for example, a CDN node closest to the downlink user).

Herein, the transcoding module performs slicing on the audio/video data provided that the audio/video format supported by the downlink user is HLS, to further send the sliced audio/video data to the distributed file system. Whether recording or screenshot needs to be performed can be determined based on specific user requirement. In an embodiment, the live streaming platform is further provided with an illegal/illegitimate content monitoring module (not shown in FIG. 5), by using the illegal content monitoring module, illegal content authentication can be performed on the screenshot in the distributed file system. If a piece of video is an illegal video that contains illegitimate content, the authentication center is notified in real time to prohibit a streamer from live streaming, and the user is prohibited from watching the live streaming. Likewise, when authenticating the user of the live streaming, the authentication center may perform illegal content authentication on the audio/video data uploaded by the user of the live streaming. As a result, an illegal video is prevented from being transferred. Finally, the downlink user selects an audio/video format based on a selection of the user and watches the live streaming close to the CDN cluster.

Figure 6:
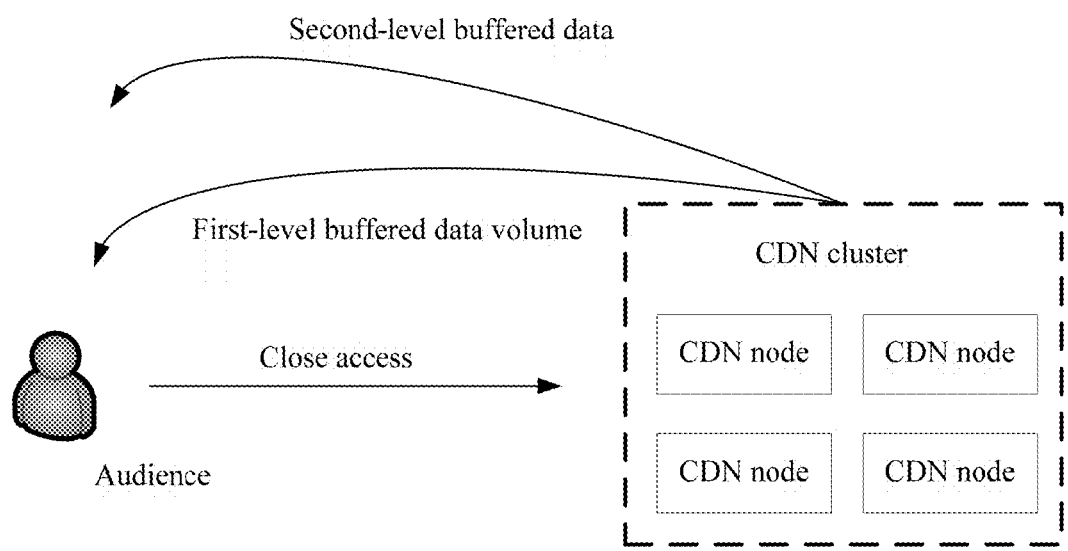
FIG. 6 is a diagram of interaction between a network device and a terminal device in a data buffering method according to an embodiment of the present disclosure.

FIG. 6 illustrates an example in which the method in this embodiment of the present disclosure is implemented based on the framework in FIG. 5. In an embodiment, an audience accesses a close CDN node in a CDN cluster, and the CDN node determines a volume of a first frame of delivered and buffered data (e.g., a first-level buffered data volume, including at least one GOP) based on a configuration requirement (e.g., a configuration requirement of an application APP) of the audience (e.g., the downlink user).

After the audience accesses the CDN node, the CDN node delivers the first frame of delivered and buffered data (e.g., the first-level buffered data) that is configured with the first-level buffered data volume to the audience at one time. Herein, the first frame of delivered and buffered data may be buffered in a player of the user, and is played by using buffered data, to further avoid, for example, a network jitter, unstable uplink audio/video data of a streamer, and frame freezing in a process of watching the live streaming caused by, for example, an abnormal retrieval network of the CDN node.

In some embodiments, a first frame buffering capacity (used to store the first frame of buffered data) is comprehensively determined based on a buffering volume and network characteristic information (for example, bandwidth, delay, and jitter) of the terminal configuration. For example, the first frame buffering capacity is determined by configuring a corresponding weight. A weight of the buffering volume is used to control broadcast fluency, and a weight of the network characteristic information is used to control a delay, so that the weight can be balanced between a delay time and the broadcast fluency, to overcome a problem that a delay of watching the live streaming by the user is relatively large when a relatively large buffering volume is configured.

In an embodiment, the CDN node sends second-level buffered data to the audience. Herein, a data volume of the second-level buffered data, that is, the second-level buffered data volume is a dynamic buffered data volume. During actual application, when a video delay that can be accepted by the audience is greater than a delay threshold (that is, a delay time that can be apparently sensed, for example, 10 seconds), the CDN node can configure the second-level buffered data volume. For example, the second-level buffered data volume is set to include at least one GOP buffer, and the number of GOPs can be dynamically adjusted based on a user network condition, for example, can be dynamically adjusted based on whether the uplink is stable. Examples of how to adjust the number of GOPs dynamically based on a user network condition are as follows:

A. a streamer uplink is stable, a network environment of an audience is congested, and second-level buffered data is a closest GOP.

B. a streamer uplink is stable, a network environment of an audience is normal, second-level buffered data is zero or is at most one closest GOP.

C. a streamer uplink is unstable, a network environment of an audience is congested, second-level buffered data is two or more closest GOPs.

D. a streamer uplink is unstable, a network environment of an audience is normal, second-level buffered data is three or more closest GOPs.

In an embodiment, when a network is congested, the video frame and/or the audio frame in the buffered data can be discarded.

For example, if a downlink user network environment or a CDN of an accessed retrieval network of a source site is congested, old buffered data can be discarded in this scenario based on a size of a data volume, to buffer data of a closest GOP, thereby laying a foundation of reducing frame freezing. For example, the audio frame may be discarded after the video frame is discarded. In an embodiment, the B frame in the video frame may be discarded first. Herein, the B frame is a bidirectional predictive frame having a high compression rate, and encoding and decoding the B frame consumes a large CPU delay. The P frame is discarded next. Finally, the I frame is discarded.

Therefore, the forgoing method reduces risks of frame freezing caused by a fixed volume of buffered data and lays a foundation of improving user experience.

Figure 7:
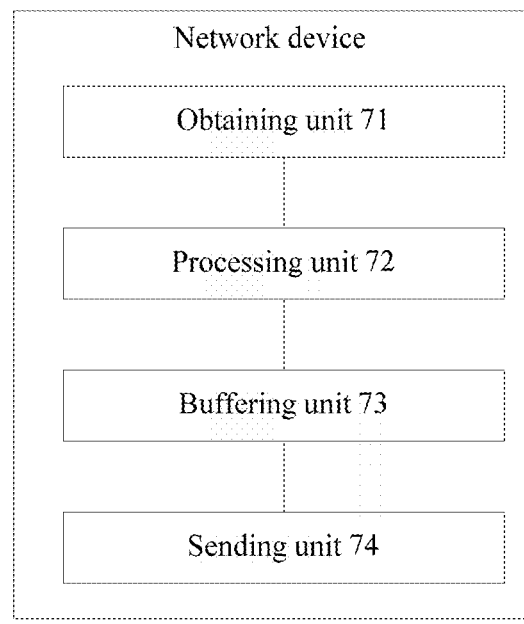
FIG. 7 is a schematic diagram of functional structures of a network device according to an embodiment of the present disclosure.

An embodiment further provides a network device. As shown in FIG. 7, the network device includes an obtaining unit 71 configured to obtain multimedia data and network characteristic information of a communications network configured to transmit the multimedia data. The communications network may include a first communications network or a second communications network. The first communications network is configured to transmit the multimedia data to the network device, and the second communications network is configured to transmit the multimedia data to a terminal device. The network device further includes a processing unit 72 configured to determine, at least based on the network characteristic information of the communications network, a target data volume corresponding to the terminal device. The network device further includes a buffering unit 73 configured to determine, based on the obtained multimedia data, first buffered data of the multimedia data and having the target data volume. The network device further includes a sending unit 74 configured to send the first buffered data to the terminal device by using the second communications network. A data volume of the first buffered data obtained by the terminal device matches the network characteristic information.

In an embodiment, the obtaining unit 71 is further configured to obtain a broadcast parameter that is used to play the multimedia data and that corresponds to the terminal device. The processing unit 72 is further configured to determine, at least based on the broadcast parameter, a preset data volume corresponding to the terminal device. The buffering unit 73 is further configured to determine, based on the obtained multimedia data, second buffered data of the multimedia data and having the preset data volume. And the sending unit 74 is further configured to detect a target instruction; and send the second buffered data to the terminal device based on the target instruction, so that the data volume of the second buffered data obtained by the terminal device matches the broadcast parameter. The target instruction is generated at least based on network establishment success information of the second communications network established by the terminal device with the network device.

In an embodiment, the obtaining unit 71 is further configured to obtain a buffering volume of the terminal device. And correspondingly the processing unit 72 is further configured to determine, based on the weighted broadcast parameter and the weighted buffering volume, the preset data volume matching the terminal device.

In an embodiment, the obtaining unit 71 is further configured to obtain a buffering volume of the terminal device. And correspondingly the processing unit 72 is further configured to determine, at least based on the buffering volume and the network characteristic information of the first communications network and/or the second communications network included in the communications network. A target data volume corresponds to the terminal device.

In an embodiment, the target data volume is represented by using a number of preset image units. And correspondingly the processing unit 72 is further configured to determine a first number of the preset image units that correspond to the terminal device and need to be buffered, and determine a total data volume of the preset image units of the first number as the target data volume corresponding to the terminal device.

In another embodiment, the processing unit 72 is further configured to determine, based on the network characteristic information of the first communications network and/or the second communications network included in the communications network, whether to perform frame loss processing on the first buffered data. The processing unit 72 is further configured to obtain an order of the priorities of frame types of an audio frame and/or a video frame when determining to perform the frame loss processing on the first buffered data. The processing unit 72 is further configured to perform the frame loss processing on the audio frame and/or the video frame in the first buffered data based on the order of the priorities of the frame types, to reduce the data volume of the first buffered data.

An embodiment of the present disclosure further provides a network device, including a processor and a memory configured to store a computer program capable of running on the processor. The processor is configured to perform the following functions when the computer program runs. The processor is configured to perform obtaining multimedia data and network characteristic information of a communications network configured to transmit the multimedia data. The communications network includes a first communications network or a second communications network. The first communications network is configured to transmit the multimedia data to the network device, and the second communications network is configured to transmit the multimedia data to a terminal device. The processor is configured to perform determining, based on the network characteristic information of the communications network, a target data volume corresponding to the terminal device. Furthermore, the processor is configured to perform determining, based on the obtained multimedia data, first buffered data representing the multimedia data and having the target data volume, and sending the first buffered data to the terminal device by using the second communications network. A data volume of the first buffered data matches the network characteristic information.

In addition, functional units in the embodiments of the present disclosure may be all integrated in a processing unit, or each unit is separately used as a unit, or two or more units are integrated in a unit. The integrated unit may be implemented in a form of hardware, or may be implemented in form of software.

The described devices are merely examples. For example, the unit division is merely logical function division and may be other division during actual implementation. For example, multiple units or components may be combined or integrated into another system, or some features may be ignored or not performed. In addition, the displayed or discussed mutual couplings or direct couplings or communication connections between the components may be implemented through some interfaces, indirect couplings or communication connections between the devices or units, or electrical connections, mechanical connections, or connections in other forms.

The units described as separation parts may be or may not be physically separated. The part used as display unit may be or may not be a physical unit. That is, the units may be located in the same place, or may be distributed to many network units. Some or all of the units need to be selected according to actual requirements to implement the purpose of the solution of the embodiments.

Figure 8:
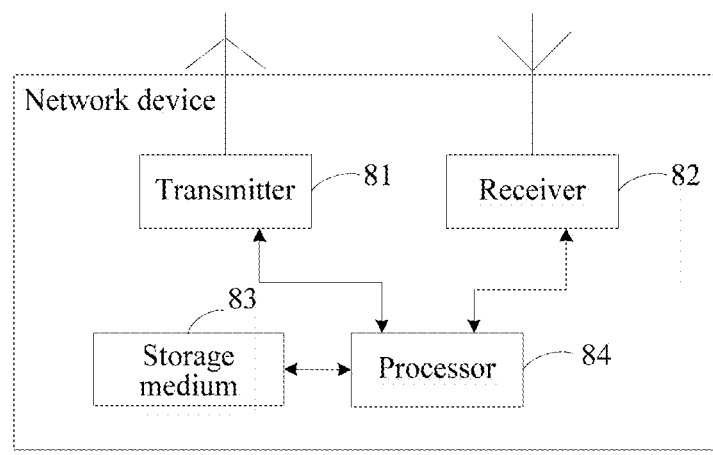
FIG. 8 is a schematic structural diagram of hardware of a network device according to an embodiment of the present disclosure.

An embodiment further provides a hardware structure of the foregoing network device. As shown in FIG. 8, the network device includes a transmitter 81, a receiver 82, a storage medium 83, and a processor 84. The processor 84 may be an electronic component having a processing function, for example, a microprocessor, a central processing unit, a digital signal processor, or a programmable logic array. The storage medium 83 includes various media that can store program code, such as a mobile storage device, a random access memory (RAM, Random Access Memory), a read-only memory (ROM, Read-Only Memory), a magnetic disk, or an optical disc. The storage medium 83 stores computer executable code, to perform the foregoing data buffering method.

Correspondingly, an embodiment of the present disclosure further provides a storage medium storing a computer instruction. The instruction, when executed by a processor, implements the following method. The method includes obtaining multimedia data and network characteristic information of a communications network configured to transmit the multimedia data. The communications network includes a first communications network or a second communications network. The first communications network is configured to transmit the multimedia data to the network device, and the second communications network is configured to transmit the multimedia data to a terminal device. The method further includes determining, based on the network characteristic information of the communications network, a target data volume corresponding to the terminal device. The method further includes determining, based on the obtained multimedia data, first buffered data representing the multimedia data and having the target data volume, and sending the first buffered data to the terminal device by using the second communications network. A data volume of the first buffered data matches the network characteristic information.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure is subject to the protection scope of the claims.

INDUSTRIAL APPLICABILITY

In the embodiments of the present disclosure, a network device obtains multimedia data and network characteristic information of a communications network configured to transmit the multimedia data. The communications network includes a first communications network or a second communications network. The first communications network is configured to transmit the multimedia data to the network device, and the second communications network is configured to transmit the multimedia data to a terminal device. A target data volume corresponding to the terminal device is determined at least based on the network characteristic information of the communications network. First buffered data representing the multimedia data and having the target data volume is determined based on the obtained multimedia data, and the first buffered data is sent to the terminal device by using the second communications network. A data volume of the first buffered data matches the network characteristic information. Therefore, risks of frame freezing caused by a fixed volume of buffered data can be reduced and anti-frame-freezing capability is improved, thereby further improving user experience.

What is claimed is:

1. A data buffering method, comprising:
obtaining, by a network device, multimedia data and network characteristic information of a network connection, the network connection including a first network connection or a second network connection, the first network connection being configured to transmit the multimedia data from a host device or a source site to the network device, and the second network connection being configured to transmit the multimedia data from the network device to a terminal device;
determining, at least based on the network characteristic information of the network connection, a target data volume corresponding to the terminal device;
determining, based on the obtained multimedia data, a first buffered data representing the multimedia data, the first buffered data having the target data volume;
sending the first buffered data to the terminal device by using the second network connection;
before the terminal device establishes the second network connection with the network device:
obtaining a broadcast parameter of the terminal device, the broadcast parameter indicating broadcast performance of playing the multimedia data by the terminal device,
determining, based on the broadcast parameter, a preset data value corresponding to the terminal device, and
determining second buffered data of the multimedia data based on the obtained multimedia data, a data value of the second buffered data being the preset data value; and
after the terminal device establishes the second network connection with the network device, receiving a target instruction from the terminal device requesting the second buffered data.

2. The method according to claim 1, wherein the method further comprises:
sending the second buffered data, determined before the terminal device establishes the second network connection with the network device, to the terminal device in response to the receipt of the target instruction requesting the second buffered data, the data value of the second buffered data matching the broadcast parameter.

3. The method according to claim 2, wherein the determining, based on the broadcast parameter, the preset data value corresponding to the terminal device comprises:
obtaining a weight of the broadcast parameter and a weight of a buffering volume of the terminal device;
performing a weighting processing on the broadcast parameter and the buffering volume based on the obtained weights; and
determining, based on the weighted broadcast parameter and the weighted buffering volume, the preset data value matching the terminal device.

4. The method according to claim 2, wherein the determining, at least based on the network characteristic information of the network connection, the target data volume corresponding to the terminal device comprises:
obtaining a weight of the network characteristic information of the network connection and a weight of a buffering volume of the terminal device;
performing a weighting processing on the network characteristic information of the network connection and the buffering volume based on the obtained weights; and
determining, based on the weighted buffering volume and the weighted network characteristic information of the network connection, the target data volume corresponding to the terminal device.

5. The method according to claim 1, wherein the determining the target data volume corresponding to the terminal device comprises:
determining a first number of to-be-buffered groups of pictures of the terminal device, and
determining a total data volume of the first number of groups of pictures as the target data volume corresponding to the terminal device.

6. The method according to claim 1, wherein the method further comprises:
obtaining an order of priorities of frame types of an audio frame and/or a video frame when the network device is determined, based on the network characteristic information of the network connection, to perform a frame loss processing on the first buffered data; and
performing the frame loss processing on the audio frame and/or the video frame in the first buffered data based on the order of the priorities of the frame types.

7. A device, comprising:
a processor; and
a memory configured to store a computer program running on the processor, wherein
the processor is configured to perform the data buffering method according to claim 1, and
the device is the network device.

8. The data buffering method according to claim 1, wherein
the data buffering method is performed by the network device,
the network device includes one or more processors, a memory, and one or more programs,
the one or more programs is stored in the memory,
the program includes one or more units, each of the one or more units corresponding to a set of instructions, and
the one or more processors is configured to execute the instructions.

9. A network device, comprising:
circuitry configured to:
obtain multimedia data and network characteristic information of a network connection, the network connection including a first network connection or a second network connection, the first network connection being configured to transmit the multimedia data from a host device or a source site to the network device, and the second network connection being configured to transmit the multimedia data from the network device to a terminal device;

determine, at least based on the network characteristic information of the network connection, a target data volume corresponding to the terminal device;

determine, based on the obtained multimedia data, first buffered data representing the multimedia data, the first buffered data having the target data volume;

send the first buffered data to the terminal device by using the second network connection, a data volume of the first buffered data matching the network characteristic information;

before the terminal device establishes the second network connection with the network device:
obtain a broadcast parameter of the terminal device, the broadcast parameter indicating broadcast performance of playing the multimedia data by the terminal device,
determine, based on the broadcast parameter, a preset data value corresponding to the terminal device, and
determine second buffered data of the multimedia data based on the obtained multimedia data, a data value of the second buffered data being the preset data value; and after the terminal device establishes the second network connection with the network device, receive a target instruction from the terminal device requesting the second buffered data.

10. The network device according to claim 9, wherein the circuitry is further configured to:
send the second buffered data, determined before the terminal device establishes the second network connection with the network device, to the terminal device in response to the receipt of the target instruction requesting the second buffered data, the data value of the second buffered data matching the broadcast parameter.

11. The network device according to claim 10, wherein the circuitry is further configured to:
obtain a weight of the broadcast parameter and a weight of a buffering volume of the terminal device;
perform a weighting processing on the broadcast parameter and the buffering volume based on the obtained weights; and
determine, based on the weighted broadcast parameter and the weighted buffering volume, the preset data value matching the terminal device.

12. The network device according to claim 10, wherein the circuitry is further configured to:
obtain a weight of the network characteristic information of the network connection and a weight of a buffering volume of the terminal device;
perform a weighting processing on the network characteristic information of the network connection and the buffering volume based on the obtained weights; and
determine, based on the weighted buffering volume and the weighted network characteristic information of the network connection, the target data volume corresponding to the terminal device.

13. The network device according to claim 9, wherein the circuitry is further configured to:
determine a first number of to-be-buffered groups of pictures of the terminal device; and
determine a total data volume of the first number of groups of pictures as the target data volume corresponding to the terminal device.

14. The network device according to claim 9, wherein the circuitry is further configured to:
obtain an order of priorities of frame types of an audio frame and/or a video frame when the network device is determined, based on the network characteristic information of the network connection, to perform frame loss processing on the first buffered data; and
perform the frame loss processing on the audio frame and/or the video frame in the first buffered data based on the order of the priorities of the frame types.

15. A non-transitory computer-readable medium storing a program executable by a processor to perform a data buffering method, the method comprising:
obtaining multimedia data and network characteristic information of a network connection, the network connection including a first network connection or a second network connection, the first network connection being configured to transmit the multimedia data from a host device or a source site to a network device, and the second network connection being configured to transmit the multimedia data from the network device to a terminal device;
determining, at least based on the network characteristic information of the network connection, a target data volume corresponding to the terminal device;
determining, based on the obtained multimedia data, first buffered data representing the multimedia data, the first buffered data having the target data volume;
sending the first buffered data to the terminal device by using the second network connection, a data volume of the first buffered data matching the network characteristic information;
before the terminal device establishes the second network connection with the network device:
obtaining a broadcast parameter of the terminal device, the broadcast parameter indicating broadcast performance of playing the multimedia data by the terminal device,
determining, at least based on the broadcast parameter, a preset data value corresponding to the terminal device, and
determining second buffered data of the multimedia data based on the obtained multimedia data, a data value of the second buffered data being the preset data value; and
after the terminal device establishes the second network connection with the network device, receiving a target instruction from the terminal device requesting the second buffered data.

16. The method according to claim 15, wherein the method further comprises:
sending the second buffered data, determined before the terminal device establishes the second network connection with the network device, to the terminal device in response to the receipt of the target instruction requesting the second buffered data, the data value of the second buffered data matching the broadcast parameter.

17. The method according to claim 16, wherein the determining, at least based on the broadcast parameter, the preset data value corresponding to the terminal device comprises:
obtaining a weight of the broadcast parameter and a weight of a buffering volume of the terminal device;

performing a weighting processing on the broadcast parameter and the buffering volume based on the obtained weights; and determining, based on the weighted broadcast parameter and the weighted buffering volume, the preset data value matching the terminal device.

18. The method according to claim 16, wherein the determining, at least based on the network characteristic information of the network connection, the target data volume corresponding to the terminal device comprises:

obtaining a weight of the network characteristic information of the network connection and a weight of a buffering volume of the terminal device;

performing a weighting processing on the network characteristic information of the network connection and the buffering volume based on the obtained weights; and determining, based on the weighted buffering volume and the weighted network characteristic information of the network connection, the target data volume corresponding to the terminal device.

19. The method according to claim 15, wherein the determining the target data volume corresponding to the terminal device comprises:

determining a first number of to-be-buffered groups of pictures of the terminal device, and determining a total data volume of the first number of groups of pictures as the target data volume corresponding to the terminal device.

20. The method according to claim 15, wherein the method further comprises:

obtaining an order of priorities of frame types of an audio frame and/or a video frame when the network device is determined, based on the network characteristic information of the network connection, to perform a frame loss processing on the first buffered data; and performing the frame loss processing on the audio frame and/or the video frame in the first buffered data based on the order of the priorities of the frame types.

* * * * *